United States Patent [19]

Matthias et al.

[11] 3,723,509
[45] Mar. 27, 1973

[54] PRODUCTION OF CARBOXYLIC ESTERS

[75] Inventors: Guenther Matthias, Ludwigshafen; Werner Kasper, Frankenthal; Gerhard Schulz, Ludwigshafen, all of Germany

[73] Assignee: Badische Anilin & Soda - Fabrik Aktiengesellschaft, Ludwigshafen am Rhineland, Rhineland-Pfalz, Germany

[22] Filed: Dec. 11, 1968

[21] Appl. No.: 783,109

[30] Foreign Application Priority Data

Dec. 13, 1967 Germany.....................P 16 43 712.0

[52] U.S. Cl...............260/488 R, 260/408, 260/410, 260/410.5, 260/410.6, 260/410.7, 260/410.9 R, 260/410.9 N, 260/469, 260/479 R, 260/488 CD, 260/488 F, 260/488 H, 260/488 J, 260/496

[51] Int. Cl..............................................C07c 67/00

[58] Field of Search....260/488 J, 488 C, 488 D, 488 F, 260/488 R, 476 R, 469, 496, 479 R, 410.9 N, 410.7, 410.6, 410.9 R, 410, 410.5

[56] References Cited

UNITED STATES PATENTS

| 1,819,818 | 8/1931 | Jaeger | 260/488 |
|---|---|---|---|
| 1,926,642 | 9/1933 | Young et al. | 260/488 |
| 2,018,759 | 10/1935 | Frolich et al. | 260/488 |

OTHER PUBLICATIONS

Reid, Industrial & Engineering Chemistry, Vol. 40, No. 9 pp. 1596–1599.

*Primary Examiner*—Vivian Garner
*Attorney*—Johnston, Root, O'Keeffe, Keil, Johnson & Shurtleff

[57] ABSTRACT

Production of carboxylic esters by reaction of alcohols with ketenes in the presence of a catalyst, if desired in an inert solvent, in the presence of aluminum silicates having exchangeable cations.

7 Claims, No Drawings

PRODUCTION OF CARBOXYLIC ESTERS

The present invention relates to a new process for the production of carboxylic esters by reaction of alcohols with ketenes in the presence of certain catalysts.

It is known that many acylations of compounds containing hydroxyl groups with ketenes which are only possible unsatisfactorily or not at all without catalysts can be carried out with good yields in the presence of catalysts. Acylations of polyhydric or higher alcohols in particular can only be carried out incompletely because the acylation products formed inhibit further reaction. Lewis acids such as sulfuric acid, p-toluenesulfonic acid, phosphoric acid, boron trifluoride, boron trifluoride etherate and potassium hydrogen sulfate are mainly used as catalysts. Since these catalysts are strong acids, however, or (as in the case of boron trifluoride) yield secondary products which are strongly acid in the presence of traces of water, they may cause corrosion in metal apparatus. Moreover in some cases the acid catalysts cause the formation of resinous products (Journal of General Chemistry of the USSR, 21, 1147 (1951).

Another disadvantage of these catalysts is that the esters formed can only be spearated satisfactorily from the catalysts by distillation. This disadvantage is shared by basic catalysts such as urea and salts of acetic acid, whose use as catalysts for acetylations of compounds containing hydroxyl groups with ketenes is known.

It is also known that alcohols can be acetylated with ketene in the presence of an ion exchanger containing sulfonic acid groups. The ion exchangers have the disadvantage, however, that they are partly dissolved by the starting materials.

The object of the invention is to provide a process for the production of carboxylic esters from alcohols and ketenes in which the esters are obtained in very good to excellent yields. Another object of the invention is to provide a process in which the ester can be separated in a simple way from the catalyst and in which the catalyst does not cause corrosion of the apparatus.

In accordance with this invention these and other objects and advantages are achieved in a process for the production of carboxylic esters by reaction of alcohols with ketenes in the presence of a catalyst, if desired in an inert solvent, in which the reaction is carried out in the presence of an aluminum silicate having exchangeable cations. According to the new process, the end products are obtained in very good to excellent yields. The catalysts to be used according to the invention are insoluble in the end products so that the final compounds can be separated from the catalyst in a simple way, for example by decantation or filtration.

Aromatic alcohols and particularly saturated and unsaturated aliphatic, cycloaliphatic and araliphatic alcohols are suitable as alcohols in the process of the invention. Suitable alcohols generally contain from 1 to 20 carbon atoms and may also bear inert substituents, for example lower alkoxy groups or halogen atoms. They may be monohydric or polyhydric and contain primary and/or secondary and/or tertiary hydroxyl groups. It is preferred to use monohydric alcohols, particularly monohydric alkanols, cycloalkanols and alkenols. Compounds of the benzene or naphthalene series having one or two hydroxy groups and which may bear inert substituents such as halogen atoms, alkoxy, aroxy, alkyl or aryl groups are advantageous as aromatic alcohols.

Example of alcohols which may be used for the process according to the invention are ethyl alcohol, isobutyl alcohol, n-decyl alcohol, cetyl alcohol, methyl glycol, ethyl glycol, n-butyl glycol, cyclohexanol, capryl alcohol, tert-butyl alcohol, allyl alcohol, linalool, nerolidol, $\beta$-phenylethyl alcohol, 1,3-propylene glycol, glycerol, p-chlorophenol, m-hydroxydiphenyl, and $\beta$-napththol.

In addition to the parent substance $CH_2=C=O$, ketenes which are suitable for the process of the invention are aldoketenes having the general formula: $RCH=C=O$ generally with from 3 to 15 carbon atoms where R denotes an alkyl or aryl group, and ketoketenes having the general formula $R^1R^2C=C=O$ advantageously having 4 to 18 carbon atoms where $R^1$ and $R^2$ denote alkyl and/or aryl groups. It is preferred to use the parent substance, ketene.

The alcohol is reacted with the ketene generally in equivalent amounts. In the case of compounds which are difficult to acetylate however it may be advantageous to use an excess of ketene, for example up to five times the stoichiometric amount, and the ketene escaping from the reaction mixture may be used for further reactions.

Natural and synthetic inorganic cation exchangers and particularly montmorillonite minerals are suitable as catalysts for the process according to the invention. The inorganic cation exchanger and the montmorillonite minerals may be used without any pretreatment. It may be advantageous however to activate the cation exchanger and montmorillonite minerals prior to use by a conventional treatment with acids.

Examples of natural inorganic cation exchangers to be used for the process according to this invention are the zeolite minerals such as analcite, chabazite, harmotome, natrolite, heulandite, mordenite, phillipsite and the glauconites. Examples of suitable synthetic inorganic cation exchangers may be prepared for example by the melting method, for example according to the process of U.S. Pat. specification No. 1,961,902 or by the precipitation method, for example according to the process of U.S. Pat. specification No. 1,906,202.

Example of suitable montmorillonite minerals are montmorillonite itself and also beidellite, saponite, hectorite and nontronite. Minerals consisting substantially of montmorillonite minerals, for example bentonite or bleaching of fullers clays, are also suitable. Suitable highly activated bleaching clays are obtained for example by acid treatment of natural bleaching clays. (Catalysts of this type are available for example under the registered Trade Marks TERRANA and TONSIL).

Although the catalysts may be used for the reaction supported on inert carrier material, it is advantageous to use them without any carrier.

The amount of catalyst to be used depends substantially on its surface area, i.e., on the degree of distribution. The smaller the specific surface area, i.e., the surface area per gram, the larger the amount of catalyst required per unit of weight of the alcohol. Depending on the specific surface area and the composition of the catalyst, it is generally used in an amount of from 5 to 800 percent by weight with reference to the alcohol.

The catalyst may be used for example as a powder or in compressed form, for example in the form of tablets, pellets, globules or rings, with or without carrier material, for the reaction.

When the starting material and end product are liquid under the reaction conditions, the process according to the invention is preferably carried out without a solvent. When solid starting materials are used or when the end products are obtained in solid form, a solvent which is inert under the reaction conditions may be used.

Examples of solvents are organic liquids such as ethers, nitriles, esters, aromatic and aliphatic hydrocarbons which may be nitrated or halogenated. Specific examples are tetrahydrofuran, dioxane, diethylene glycol dimethyl esther, acetonitrile, ethyl acetate, benzene, xylene, chlorobenzene, nitrobenzene, petroleum naphtha, nitromethane and tetrachloroethane. It is preferred to use a solvent which differs markedly in boiling point from the end product. Solutions of the starting material containing hydroxyl groups in the end product may naturally also be used for the process according to this invention.

The ratio by weight of solvent to starting material is generally from 5:1 to 1:5.

It is advantageous to use temperatures of from 0° to 100°C in the process according to the invention.

The process is generally carried out at atmospheric pressure. It is also possible however, for example in the reaction of compounds which it is difficult to acetylate, to use subatmospheric pressure, for example 50 mm, to prevent the formation of diketene. In the case of readily acetylatable compounds it may be advantageous to carry out the reaction at superatmospheric pressure.

The starting material ketene may be prepared in the usual way by thermal cleavage of suitable compounds such as acetone or glacial acetic acid. The ketene is obtained is generally used without further purification.

In order that the gaseous ketene passed in should be reacted as completely as possible it is advantageous for the ketene to be brought into intimate contact with the alcohol and with the solid catalyst. This can be done for example by using a column known as a bubble column, an elongated vertical reactor. In the bubble column, which is advantageously substantially filled with the dissolved or undissolved compound containing hydroxyl groups and which contains the catalyst, ketene is passed in finely divided form into the botton. Intimate contact between starting materials and catalyst is thus achieved, particularly if the catalyst is powdery and is fluidized by the inflowing ketene.

The reaction generally takes from 5 minutes to 10 hours according to the reaction temperature and the intensity of mixing of the starting materials and the catalyst.

The compounds obtained by the process according to this invention may be used as valuable intermediates, for example for adhesive or film material, and some of them are important solvents, for example for the surface coatings.

The following Examples illustrate the invention.

EXAMPLE 1

76 g (1 mole) of ethylene glycol monomethyl ether and 35 g of highly active bleaching clay (registered Trade Mark TONSIL of the firm Sued-Chemie) in the form of spheres having a diameter of 3 mm are fed into a cylindrical glass tube having an internal diameter of 27 mm and having a fritted glass disc as the base plate. 1.56 moles of ketene is passed in through the disc at 50°C within 130 minutes. The excess of dissolved ketene is expelled from the reaction product at 50°C by passing nitrogen through. The reaction product is decanted from the catalyst; 120 g of reaction product is obtained consisting of 98 percent by weight of glycol monomethyl ether acetate, equivalent to a yield of 98 percent of the theory.

In a comparative experiment the procedure of Example 1 is followed but no catalyst is used and 1.34 moles of ketene is passed in within 140 minutes. 104 g of reaction product is obtained; it consists to the extent of 64.4 percent by weight of glycol monomethyl ether acetate, i.e., the yield is 64 percent of the theory.

EXAMPLE 2

The procedure of Example 1 is followed but 5 g of TERRANAERDE A (registered Trade Mark; a highly activated bleaching clay from the firm Sued-Chemie) is used and 2.3 moles of ketene is passed in at 50°C within 105 minutes. 120 g of reaction product is obtained; it consists to the extent of 99 percent by weight of glycol monomethyl ether, equivalent to a yield of 98 percent of the theory.

EXAMPLE 3

77 g (0.5 mole) of linalool and 100 g of highly activated bleaching clay (TONSIL from the firm Sued-Chemie) in the form of spheres having a diameter of 3 mm are fed into the apparatus described in Example 1. 1.5 moles of ketene is passed in at 15°C within 135 minutes. 31.4 percent of the starting material has been acetylated after this time.

For purposes of comparison, the reaction is carried out in the absence of catalyst. Only about 1 percent of the linalool has been acetylated after 135 minutes.

EXAMPLE 4

1.1 mole of ketene is passed at 50°C within 120 minutes in the apparatus described in Example 1 into a mixture of 88 g (1 mole) of isoamyl alcohol and 5 g of powdered zeolite (zeolite "Bayer" K 10, ZE 027 from the firm Schuchardt, Munich). Isoamyl acetate is obtained in a yield of 97 percent after working up.

For comparison, the reaction is carried out in the absence of a catalyst; only 70 percent of the isoamyl alcohol has been acetylated after 120 minutes.

We claim:

1. A process for the production of carboxylic esters which comprises reacting in liquid phase an alcohol selected from the group consisting of alkanols, cycloalkanols and alkenols having 1–20 carbon atoms and 1–3 -OH groups or said alcohols substituted by a lower alkoxy or a halogen group with ketene in the presence of a zeolite or a montmorillonite as a catalyst at 0°-100°C.

2. A process as claimed in claim 1 wherein the reaction is carried out in an inert solvent.

3. A process as claimed in claim 1 wherein a montmorillonite mineral is used as catalyst.

4. A process as claimed in claim 3 wherein the montmorillonite mineral used has been activated by treatment with acid.

5. A process as claimed in claim 1 wherein said alcohol is a monohydric alkanol, a cycloalkanol or an alkenol respectively having up to 20 carbon atoms.

6. A process as claimed in claim 1 wherein said alcohol is an alkane diol or glycerol.

7. A process as claimed in claim 1 wherein a zeolite is used as the catalyst.

* * * * *